Jan. 7, 1947.  F. C. WARNE  2,413,807
TRACTOR AND IMPLEMENT CONNECTING MEANS
Filed Nov. 10, 1943  3 Sheets-Sheet 1
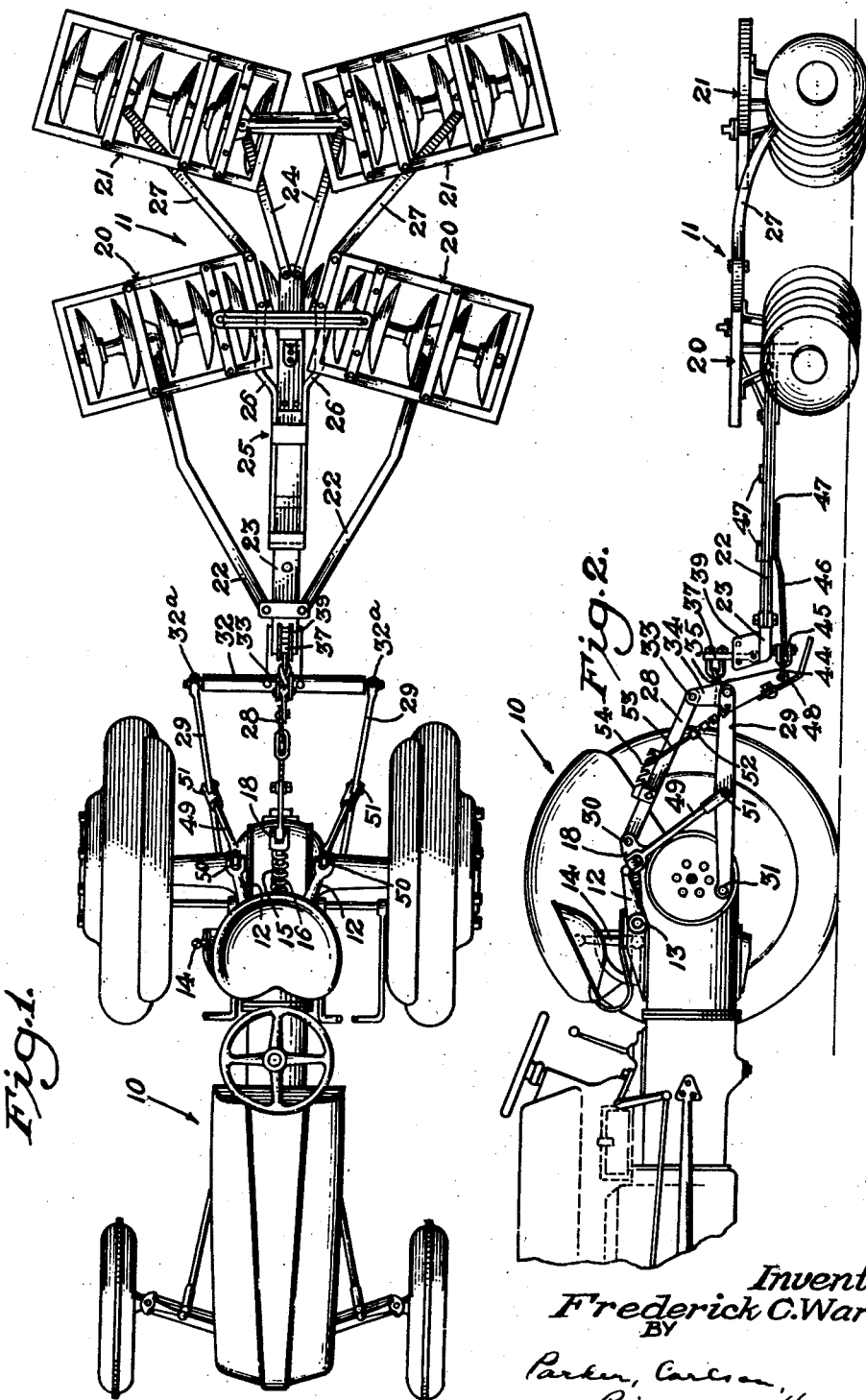
Inventor
Frederick C. Warne
BY
Parker, Carlson,
Pigman + Hubbard.
Attorneys.

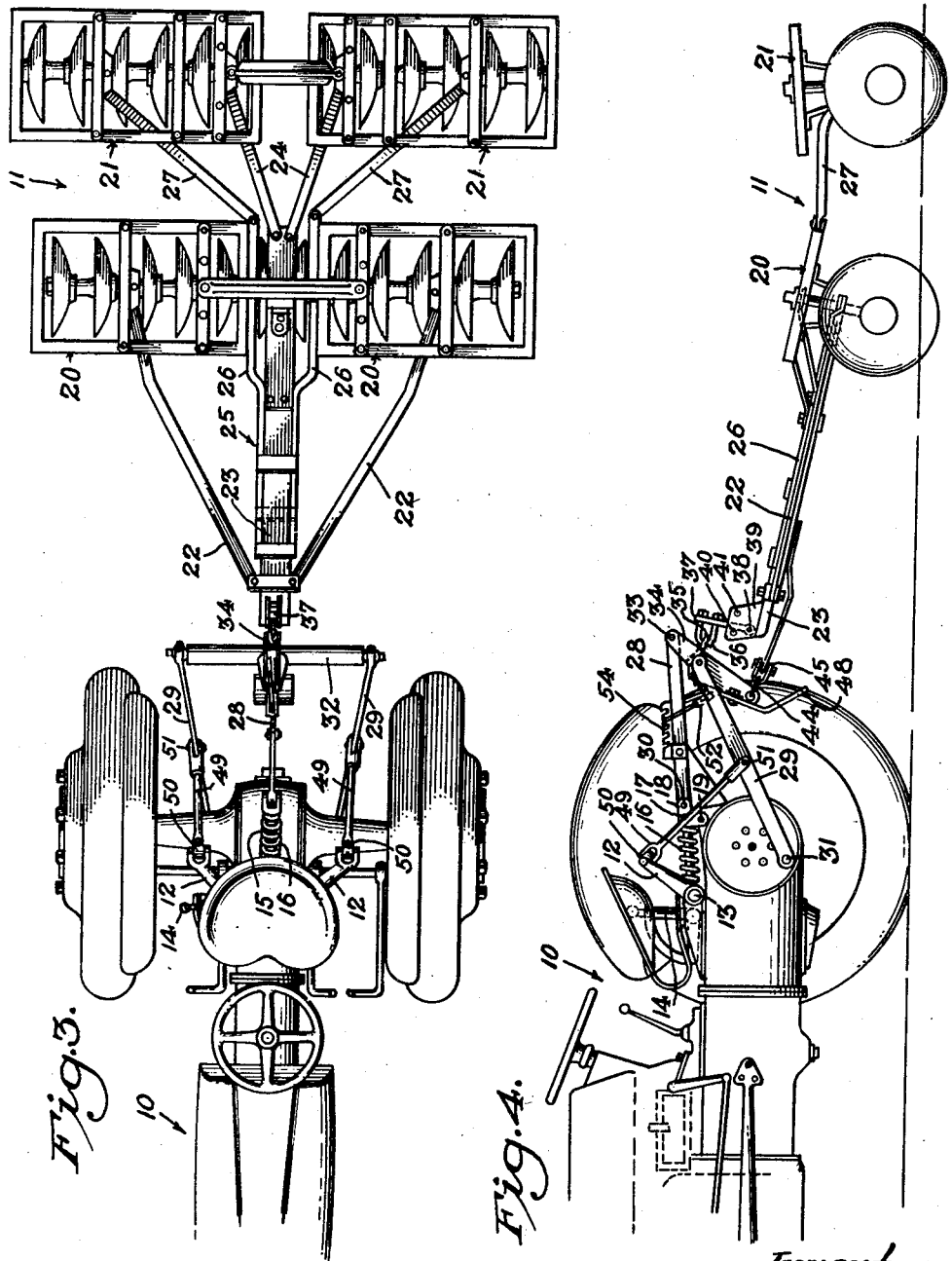

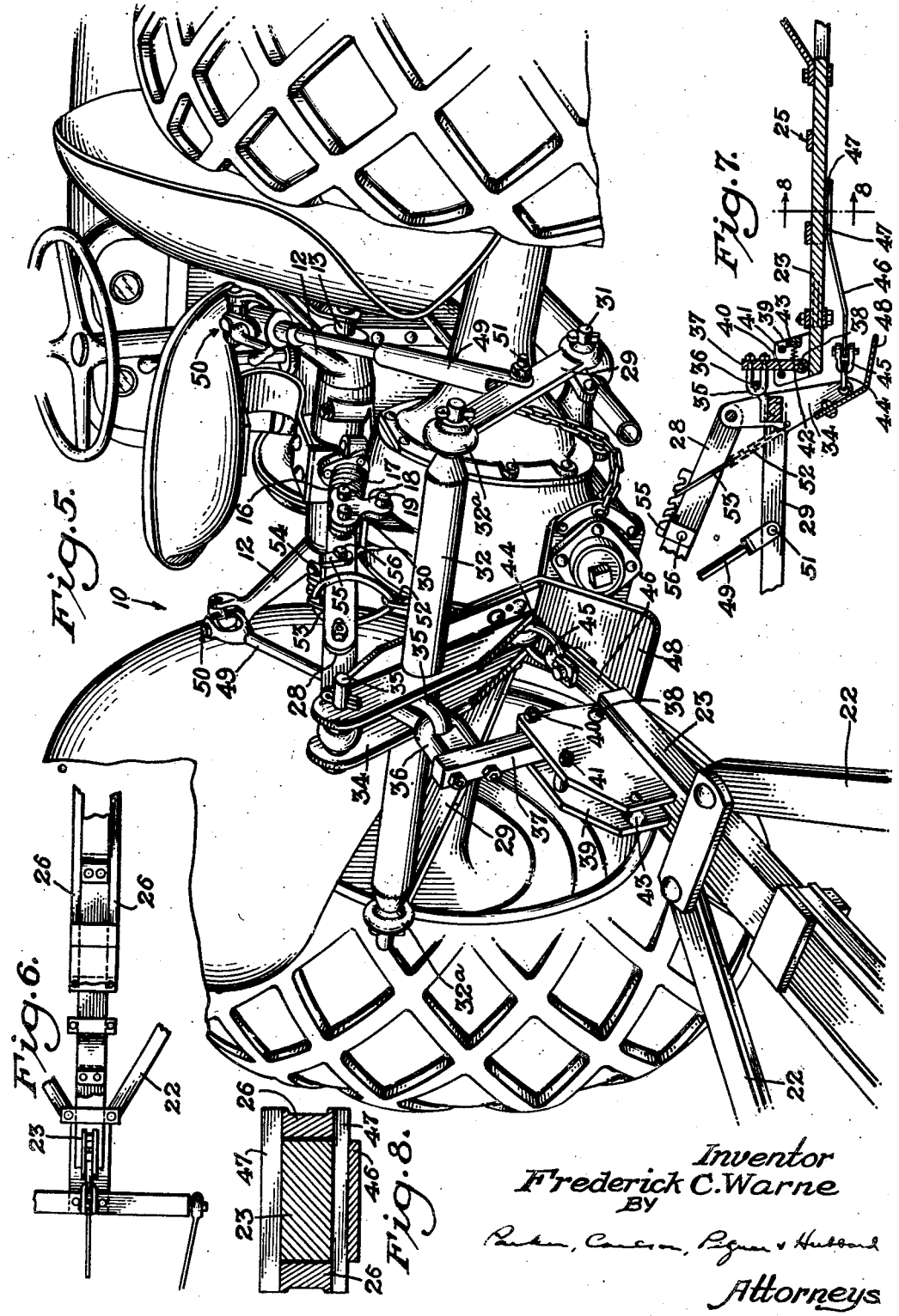

Patented Jan. 7, 1947

2,413,807

UNITED STATES PATENT OFFICE 2,413,807

TRACTOR AND IMPLEMENT CONNECTING MEANS

Frederick C. Warne, Mansfield, Ohio, assignor to Farm Tools, Inc., Mansfield, Ohio, a corporation of Indiana Application November 10, 1943, Serial No. 509,657

7 Claims. (Cl. 55—83)

1

The present invention relates to means for connecting farm implements or the like to tractors and has as its general aim the provision of a new and improved connecting means of this nature which is simple in construction and highly effective in operation.

Certain tractor drawn implements have operative movements which may be controlled or effected by power means on the tractor. For example, in a gang harrow the gangs swing between an operative, working relation in which the gang discs are angled with respect to the line of draft and an inoperative transport position in which the gangs are transversely alined and the discs have no angularity to the line of draft. In a typical arrangement the gangs are pulled to and held in the non-angled position during transport and are released to be swung to the angled position by their engagement with the ground when the harrow is drawn forwardly. Power means on the tractor has been employed in various ways to effect this swinging movement of the harrow gangs or in a broader sense to produce the comparable operative or control movements of other implements.

An object of the invention is to provide a new and improved connecting means (sometimes referred to as a "hitch") for operatively securing an implement or the like to a tractor which embodies a novel arrangement of parts for translating an operative movement of a power actuator on the tractor into a positioning or control movement of an implement part.

Another object of the invention is to provide a novel hitch connection arranged for association with a power lift on the tractor and adapted in a movement thereof by the power lift to produce a fore and aft movement of a part connected with a control member of an implement whereby to actuate the control member.

More specifically an object is to provide a new and improved hitch for connecting a gang harrow with a tractor having a power actuator thereon which includes a quadrilateral linkage arrangement that is shiftable by the power actuator and has a lever arm movable by such shifting to actuate the control element of an implement or the like.

Another object of the invention is to provide a hitch for a gang harrow or the like which not only connects the harrow to a tractor but enables control of the operative or inoperative condition of the harrow by a power lift mechanism on the tractor.

In conjunction with the foregoing, another object is to provide a hitch which embodies improved means for compensating for an abnormal increase in the draft of the implement.

Other objects and advantages will become apparent in the following description from the accompanying drawings in which:

Figure 1 is a plan view of a tractor and implement connected together by a hitch embodying the features of the present invention, the parts being shown in operative, ground working condition.

Fig. 2 is a side view of the assembly shown in Fig. 1.

Figs. 3 and 4 are respectively plan and side views substantially like Figs. 1 and 2 but showing the structure in its inoperative transport position.

Fig. 5 is a fragmentary perspective view on an enlarged scale illustrating the hitch in transport position.

Fig. 6 is a fragmentary plan view of the hitch with parts thereof broken away.

Fig. 7 is a longitudinal vertical sectional view through the hitch.

Fig. 8 is a transverse sectional view taken substantially along the line 8—8 of Fig. 7.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, an exemplary form of the invention has been shown and will be described as the hitch or connecting means between a tractor generally designated 10 and a tandem gang harrow 11, the latter being representative of an implement or the like to be drawn by the tractor and having a positionable part or parts manipulable in the operative control of the implement. The tractor itself may take a variety of forms and that illustrated herein is one of well-known commercial design. It embodies, in addition to the usual tractor mechanisms, a power-operated lift means which includes a pair of arms 12 fixed to a transverse shaft 13 (Figs. 2 and 5) to swing in unison through a limited arc.

The construction and operation of this and comparable units which afford a source of auxiliary power on the tractor is well known in the art. For purposes of exemplification and identification, the power unit shown here is substantially the same as that disclosed in Ferguson Patent No. 2,118,180, issued May 24, 1938. A detailed description of the construction and operation thereof is accordingly unnecessary. Briefly described, however, a hydraulic ram (not shown) acts through the shaft 13 to swing the arms 12 upwardly, the return or descent movement of the arms being controlled by the release of pressure fluid from the ram. Supply of pressure fluid to the ram to raise the arms may be controlled manually by a lever 14 (Fig. 1) or by automatic actuation of a valve operating plunger or reversing control member 15. This plunger is biased outwardly by a compression spring 16 (see Fig. 5 particularly) which is connected at its outer end by a pivot 17 to the center point of a rigidly joined pair of bell cranks 18 pivoted, as at 19, at the rear of the tractor to swing fore and aft. An inward thrust on the plunger 15 causes pressure fluid to be admitted to the ram to elevate the arms 12 to the position thereof shown in Fig. 4. Outward movement of the plunger causes fluid to be bled from the ram to permit descent of the arms 12 to a lowered position as shown in Fig. 2. Restoration of the plunger to a midpoint or neutral position causes the arms to stop in whatever position they may then occupy.

The tandem type gang harrow here illustrated is for the most part of conventional form comprising, as shown in Figs. 1 and 2, front and rear pairs of disc gang frames 20 and 21, respectively, arranged in transverse or end-to-end alinement. The front gangs are pivotally connected toward their outer ends to arms 22 which are rigid with a draft bar 23 and the rear gangs 21 are pivoted toward their inner ends to arms 24 on the draft bar. A slide generally designated 25 is movable in a fore and aft direction on the draft bar 23 and includes side arms 26 which are pivotally connected to the front pair of gangs 20 toward their inner ends. Movement of the slide along the draft bar will accordingly swing the front gangs about their pivotal connections with the arms 22. Links 27 pivotally connected to the front gangs near their inner ends and to the rear gangs toward their outer ends cause the rear gangs to follow the swinging movement of the front gangs.

The arrangement is such that when the slide 25 is in its forward position, as shown in Fig. 3, the front and rear gangs are in transversely alined end-to-end relation. This is the inoperative or transport position of the gangs. When the slide 25 is in its rear position, as shown in Fig. 1, the front and rear pairs of gangs have angled positions with respect to the line of draft, this being the operative or working position of the harrow. In this type of harrow, power means is conveniently employed to pull the slide 25 forwardly to move the gangs from their operative angled relation to their inoperative transport position and the slide must be held in its forward position to maintain the gangs in transport condition. To restore the gangs to their angled relation for operation it is only necessary to release the slide 25, whereupon forward movement of the implement will cause the gangs to swing to their angled position.

A hitch embodying the present invention is intended operatively to connect a tractor and implement of the character above described in such fashion that the hitch provides not only a draft connection, but is also responsive to the relative movements of the hitch to the tractor and implement (which movements are conveniently effected by the power mechanism) for controlling the movements of the positionable part as represented in this instance by the slide 25 of the gang harrow.

Referring to the drawings, and particularly to Figs. 1 and 2 thereof, the hitch is shown as applied to vertically spaced rearwardly extending upper and lower arms or links 28, 29, respectively, arranged to be connected as by pivots 30, 31 to vertically spaced points at the rear of the tractor. The upper link 28 is in this instance pivoted to the rearwardly extending arms of the bell crank 18 for a reason which will hereinafter be set forth. The lower of the links is actually comprised of a pair of links connected in transversely spaced relation by the pivots 31 to the differential housing of the tractor at points below and in advance of the rear axle. This pair of links 29 diverge in a rearward direction and at their rear ends are detachably connected as at 32a with a transversely extending draw-bar 32, such draw-bar being comprised in the novel hitch herein disclosed.

The upper link 28 is located substantially equidistantly between the lower links 29 and is pivotally and detachably connected as at 33 to the upper end of a channel-shaped lever on attachment link 34 fixed to the draw-bar intermediate the ends thereof and also comprised in the hitch. The lever 34 is joined to the draw-bar 32 between the ends of the lever so that its lower free end extends downwardly a substantial distance below the draw-bar 32. The draw-bar 32 and lever 34 included in the hitch detachably secured to the tractor-borne linkage 28, 29 thus constitute what may be termed an attachment frame which is of generally cruciform shape. The dimensions of the links 28 and 29 are preferably such as to locate the lever 34 in a generally vertical direction when the hitch parts 32, 34 are applied to the linkage 28, 29.

It is preferred that the links 28 and 29 be secured not only to the tractor but also to the lever 34 and draw-bar 32, respectively, by means of suitable universal joints (herein shown as being of the ball and socket type) thereby permitting lateral swing of the linkage 28, 29 in effecting accurate trailing of the implement behind the tractor during turning, as well as the vertical movement of the linkage used in adjusting the implement as described hereinafter.

In normal operation the lower links 29 and the draw bar 32 primarily constitute the direct draft connection from the tractor and the upper link 28 serves as a compression member for swinging the lever 34 upon any relative upward movement of the linkage to the tractor. To establish a draft connection with the implement an eye 35 is fixed to extend rearwardly from the lever 34 immediately above the draw-bar 32 for engagement with a clevis 36 or the like carried by the gang harrow. The clevis is carried on an upstanding pin or arm 37 (see Fig. 5 particularly) pivotally secured through its lower end as at 38 between the side walls of an upwardly opening box-like casing 39 rigid with the front end of the harrow draft bar 23. A cross pin 40 (see Fig. 7) fixed between the side walls at the front of the casing is engageable by the arm 37 in its forward or draft position and a second pin 41 rearwardly spaced therefrom limits the permissible backward swing of the arm. This lost motion in the connection of the arm 37 to the draft bar of the harrow is provided for the convenience of the user in assembling or disassembling the clevis 36 and eye 35. The arm may if desired be held in abutment with the pin 40 by such means as a spring 42 bearing against the arm and seated at its other end on a block 43 in the casing.

For connecting the lever 34 with the slide 25 the lower end of the lever 34 carries an eye or ring 44 for engagement by a clevis 45 which in turn is mounted on the front end of a link 46 that extends rearwardly beneath the harrow draft bar 23. The link connects with the slide 25 as by being fixed to two of a series of cross members 47 which extend between the forward end portions of the harrow frame arms 26 above and below the draft bar 23 to form the slide 25 (see Fig. 8). This arrangement provides that the position of the slide 25 longitudinally of the draft bar will be controlled by the lever 34. At its lower end the lever may be provided with a rearwardly and downwardly angling ground-engaging foot or sled member 48.

Vertical swinging movement of the linkage 28, 29 is effected by the arms 12 of the hydraulic power lift mechanism through the medium of arms 49 universally connected as at 50 at their upper ends to the arms 12 and pivotally connected as at 51 through their lower ends to intermediate points on the links 29.

Preferably, adjustable means is provided positively to limit the lowermost position of the hitch. To this end a chain or similar flexible connector 52 (Fig. 7) is fastened at one end to the lever 34 adjacent to the draw bar. At its other end is a ring or loop 53 selectively engageable with one of a series of upwardly opening notches 54 in a plate 55 secured to the upper link 28 to extend longitudinally thereof along its upper edge. Where, as in this instance, the upper link 28 is formed in two sections secured together in various relative positions by bolts 56 for adjustment as to length, the notched plate 55 may be conveniently secured to the upper link by one of the bolts 56.

Before considering the operation of the present hitch, it will be observed from a consideration and comparison of Figs. 2 and 4 that the upper and lower links 28, 29, together with the vertical intermediate portion of the rear end of the tractor and the upper end of the lever 34 between the draw-bar 32 and the pivot 33, form a quadrilateral arrangement having pivotally joined apexes. In its lowermost position, as shown in Fig. 2, the linkage may be said to be distended, whereas in its uppermost position, as shown in Fig. 4, the linkage may be said to be collapsed. The vertical swinging movements of the linkage relative to the tractor and also to the implement causes the lever 34 to swing in a fore and aft direction, which swinging movement is utilized to control the position of the gang adjusting slide 25 of the harrow.

When it becomes necessary to shift the harrow gangs from their angled working position to their transport position, the operator manipulates the hydraulic power lift control lever 14 to raise the arms 12, thereby swinging the links 29 vertically upward. The quadrilateral linkage arrangement previously mentioned causes the lever 34 to swing or rock in a clockwise direction, as seen in Fig. 2, during the upward movement of the linkage 29, thereby applying a force (through the connecting members 44, 45 and 46) to the slide 25. The resultant forward movement of the slide swings the harrow gangs to their transport position (Figs. 3 and 4). It will be seen that in this position the hitch, as well as the front end of the harrow draft bar, are elevated so that they cannot be injured by striking an obstacle while the apparatus is moving from place to place.

To restore the harrow gangs to their angled working position it is only necessary for the operator by manipulation of the lever 14 to cause the downward movement of the arms 12. The descending movement of the hitch linkage swings the lever 34 in a reverse or counterclockwise direction. If the tractor is moving forwardly at the time, the drag of the ground on the harrow discs will cause the harrow gangs to swing to their angled position. However, should the linkage be lowered when the apparatus is stationary, there is sufficient looseness in the connecting members to permit the linkages to descend and the gang harrows will thereafter move to their angled position when the tractor next moves forwardly. The maximum permissible angle of the gangs is adjusted by the limiting means 52, 53, 54 to hold the linkage in a corresponding elevated position.

If, in the operation of the harrow, the rear end of the tractor should drop into a depression, the expected result would be a lowering of the line of draft and a deeper penetration of the harrow discs into the ground. The present hitch, however, automatically compensates for such relative movement of the tractor and harrow. Thus, as the rear end of the tractor drops the draft connection causes a relative upward swing of the linkage 28, 29 and the compression force on the upper link 28 swings the upper end of the lever 34 rearwardly to exert a forward pull on the slide 25. The harrow gangs will accordingly be drawn to a less angled position and the extent of their movement will be determined by the relative tipping movement of the tractor and harrow. The same result will be accomplished by an engagement between the shoe 48 on lever 34 with the ground. Such engagement will exert a lifting force on the hitch linkage to produce a gang-shifting rotation of the lever 34.

As a further factor in the automatic control of the angled positions of the harrow gangs, it has been mentioned that the upper link 28 is at its forward end preferably connected through the bell crank 18 to the plunger 15 which controls the flow of pressure fluid to or from the hydraulic ram of the power lift means. The compression spring 16 is of course adjusted to exert a force which will balance those normally acting through the upper link 28. Should, however, the upper link be placed under an excessive compression force (as, for example, by the sudden lowering of the rear end of the tractor), such force will shift the plunger 15 inwardly to admit pressure fluid to the hydraulic ram to raise the arms 12 and lift the hitch linkages. The linkages will rise until the compression force on the upper link 28 is relieved to the extent that the plunger 15 will return to its neutral position. When the relationship of the tractor and harrow has been returned to normal, the draft on the hitch linkage will tend to return it to its lowermost position, permitting the plunger 15 to shift outwardly and allow the hydraulic mechanism to return to neutral.

It will be evident from the foregoing that a new and improved hitch has been provided for connecting an implement to a tractor which embodies new and improved means for translating the force available in an auxiliary power source on the tractor into a movement of a positionable part on the implement. The hitch is simple in construction and effective in operation, and it avoids the use of separate connections running from the auxiliary power source to the part on the implement to be actuated. As a result, the implement can be quickly and conveniently disassembled by simply disengaging the connections between the draw-bar 32 and the lower links 29 and between the upper end of the lever 34 and the link 28, and slipping the ring 53 over the free end of the upper link. Such disassembly leaves the upper and lower links and the mechanisms associated therewith attached to the tractor and available for use with other hitches.

I claim as my invention:

1. In a combination draft and control hitch for connecting an implement or the like having a positionally adjustable element to a draft linkage on a tractor in such manner as not only to apply draft load from the implement to the tractor through such linkage but also to utilize movement of the linkage relative to the tractor for adjusting said element of the implement, said linkage including a lower laterally spaced pair of tension links and an upper compression link all trailingly pivoted on the tractor and said lower links being adapted for vertical movement by a power unit on the tractor, the combination of a rigid cruciform attachment frame comprising a transverse draw-bar and an upright attachment link rigidly connected intermediate its ends with the center of said draw-bar, universal joints connecting opposite ends of said draw-bar to respective trailing ends of said lower pair of links and a pivotal connection between the upper end of said attachment link and said compression link, whereby to effect fore and aft tilting of said attachment frame about the longitudinal axis of said draw-bar as an incident to vertical movement of the tractor-borne linkage by the power unit, means for trailingly connecting the implement to said attachment frame at a point substantially coincident with the axis of tilting motion of the latter, and means for connecting said implement element to said attachment link at a point eccentric to said axis.

2. In a combination draft and control hitch for connecting an implement or the like having a positionally adjustable control element to a draft linkage on a tractor in such manner as not only to apply draft load from the implement to the tractor through such linkage but also to utilize movement of the linkage relative to the tractor for adjusting said control element of the implement through a limited range of movement to correspondingly alter the operation of the element, the combination of a rigid attachment frame, means for detachably pivoting said attachment frame to the tractor-borne linkage in position to effect fore and aft tilting of said attachment frame as an incident to vertical movement of the tractor-borne linkage, means for trailingly connecting the implement to said attachment frame at a point substantially coincident with the axis of tilting motion of the latter, and means for connecting said implement control element to said attachment frame at a point eccentric to said axis.

3. In a combination draft and control hitch for connecting an implement or the like having a positionally adjustable element to a draft linkage on a tractor in such manner as not only to apply draft load from the implement to the tractor through such linkage but also to utilize movement of the linkage relative to the tractor for adjusting said element of the implement, said linkage including a lower laterally spaced pair of tension links and an upper compression link all trailingly pivoted on the tractor and said lower links being adapted for vertical movement by a power unit on the tractor, the combination of a rigid cruciform attachment frame comprising a transverse draw-bar and an upright attachment link rigidly connected intermediate its ends with the center of said draw-bar, universal joints connecting opposite ends of said draw-bar to respective trailing ends of said lower pair of links and a pivotal connection between the upper end of said attachment link and said compression link, whereby the thrust of said compression link on the upper end of said attachment link serves to rock the same rearwardly about the longitudinal axis of said draw-bar as an incident to upward movement of said lower pair of links, a ground shoe carried by the lower portion of said attachment link, whereby said attachment link causes said lower pair of links to swing upwardly upon contact of said shoe with the ground, means for trailingly connecting the implement to said attachment frame at a point substantially coincident with the axis of tilting motion of the latter, and means for connecting said implement element to said attachment link at a point eccentric to said axis.

4. In a combination draft and control hitch for connecting an implement or the like having a positionally adjustable element to a draft linkage on a tractor including upper and lower links trailingly pivoted on such tractor at vertically spaced points on the latter and adapted to be swung vertically by a power unit on the tractor, the combination of an attachment frame, means for detachably pivoting said attachment frame at vertically spaced points on the latter to trailing portions of respective ones of said upper and lower links, whereby to effect fore and aft tilting of said attachment frame as an incident to vertical swing of the links, a forwardly projecting draft bar for the implement having a longitudinally movable slide thereon connected to said positionally adjustable element of the implement, means for pivotally connecting said draft bar in trailed relation from said frame at a point on the latter generally coincident with the axis of said frame's pivotal connection to the lower link on the tractor, and means for connecting said slide to said frame at a point on the latter eccentric to said axis.

5. In a hitch for connection between a tractor having vertically spaced upper and lower links trailingly pivoted on its rear portion for vertical motion of the same by a power unit on the tractor, and an implement or the like having a movably adjustable element, the combination of a forwardly extending draft bar for the implement, an attachment link pivotally connected in generally upright position to the forward end of said draft bar for fore and aft bodily swinging motion with reference to the latter, means for connecting the movably adjustable element of the implement to said attachment link at a point on the latter displaced from the point of pivotal connection between said draft bar and attachment link whereby to effect adjusting movement of said element as an incident to fore and aft tilting of said attachment link, and means for pivotally connecting said attachment link to trailing portions of the links on the tractor for fore and aft tilting of said attachment link as an incident to vertical motion of the tractor mounted links.

6. In a hitch for connecting a tractor with a gang harrow having gangs mounted for swinging movement between an angled working position and a transverse non-working position and means shiftable in a forward direction to draw said gangs from the working to the non-working positions thereof, said tractor having vertically spaced upper and lower links trailingly pivoted on its rear portion for vertical motion of the same by a power unit on the tractor, the combination of a forwardly extending draft bar for the harrow, an attachment frame pivotally connected in generally upright position to the forward end of said draft bar for fore and aft rocking motion with reference to the latter, means for connecting said shiftable means to said frame at a point on the latter eccentric to its axis of rocking motion to thereby move the harrow gangs fore and aft in accordance with fore and aft rocking motion of said frame, and means for pivotally connecting said frame to trailing portions of the links on the tractor with said frame in generally upright position spanning the distance between such links and with its axis of pivotal connection to the lower link substantially coincident with said axis of rocking motion, whereby said frame is tilted fore and aft as an incident to vertical motion of the tractor-borne links.

7. In a hitch for connecting a tractor with a gang harrow having gangs mounted for swinging movement between an angled working position and a transverse non-working position and control means shiftable in a forward direction to draw said gangs from the working to the non-working positions thereof, said tractor having vertically spaced upper and lower links trailingly pivoted on its rear portion for vertical motion of the same by a power unit on the tractor, the combination of a forwardly extending draft bar for the harrow, an attachment frame pivotally connected in generally upright position to the forward end of said draft bar for fore and aft rocking motion with reference to the latter, means for connecting said control means to said frame at a point on the latter eccentric to its axis of rocking motion to thereby move the harrow gangs fore and aft in accordance with fore and aft rocking motion of said frame, and means for pivotally connecting said frame to trailing portions of the links on the tractor for fore and aft tilting of said frame as an incident to vertical motion of such tractor-borne links.

FREDERICK C. WARNE.